United States Patent
Hackett et al.

(10) Patent No.: US 11,015,040 B2
(45) Date of Patent: May 25, 2021

(54) CURABLE RESIN INCLUDING NANOPARTICLES INCLUDING SURFACE-BONDED HYDROPHOBICALLY-MODIFYING ALKYL GROUPS

(71) Applicant: 3M INNOVATIVE PROPERTIES COMPANY, St. Paul, MN (US)

(72) Inventors: Steven C. Hackett, Oakdale, MN (US); James M. Nelson, Woodbury, MN (US); Wendy L. Thompson, Roseville, MN (US); Kristin L. Thunhorst, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 118 days.

(21) Appl. No.: 16/338,366

(22) PCT Filed: Oct. 17, 2017

(86) PCT No.: PCT/US2017/056934
§ 371 (c)(1),
(2) Date: Mar. 29, 2019

(87) PCT Pub. No.: WO2018/085040
PCT Pub. Date: May 11, 2018

(65) Prior Publication Data
US 2020/0024427 A1 Jan. 23, 2020

Related U.S. Application Data

(60) Provisional application No. 62/418,368, filed on Nov. 7, 2016.

(51) Int. Cl.
*C08K 9/06* (2006.01)
*C08K 3/36* (2006.01)

(52) U.S. Cl.
CPC ............ *C08K 9/06* (2013.01); *C08K 3/36* (2013.01); *C08K 2201/011* (2013.01)

(58) Field of Classification Search
None
See application file for complete search history.

(56) References Cited

U.S. PATENT DOCUMENTS

| 4,684,678 | A  | 8/1987  | Schultz     |
| 5,453,262 | A  | 9/1995  | Dawson      |
| 5,648,407 | A  | 7/1997  | Goetz       |
| 7,482,201 | B2 | 1/2009  | Charles     |
| 2011/0021797 | A1 | 1/2011  | Tiefenbruck |
| 2011/0028605 | A1 | 2/2011  | Nelson      |
| 2011/0309074 | A1 | 12/2011 | Thunhorst   |
| 2012/0309870 | A1 | 12/2012 | Thunhorst   |
| 2014/0316027 | A1 | 10/2014 | Thompson    |

FOREIGN PATENT DOCUMENTS

| EP | 1701180         | 9/2006  |
| JP | 2002-212564     | 7/2002  |
| WO | WO 2009-120846  | 10/2009 |
| WO | WO 2009-120848  | 10/2009 |
| WO | WO 2009-152296  | 12/2009 |
| WO | WO 2009-152301  | 12/2009 |
| WO | WO 2010-005710  | 1/2010  |

OTHER PUBLICATIONS

Adschiri, "Rapid and Continuous Hydrothermal Crystallization of Metal Oxide Particles in Supercritical Water", Journal of the American Ceramic Society, Apr. 1992, vol. 75, No. 4, pp. 1019-1022.
International Search Report for PCT International Application No. PCT/US2017/056934, dated Jan. 18, 2018, 4 pages.

*Primary Examiner* — Robert T Butcher
(74) *Attorney, Agent, or Firm* — Philip P. Soo

(57) ABSTRACT

Various embodiments disclosed relate to a resin including nanoparticles including surface-bonded hydrophobically-modifying alkyl groups. The present invention provides a resin component that includes a curable resin. The resin component also includes nanoparticles dispersed in the resin. The nanoparticles each independently include surface-bonded hydrophobically-modifying $(C_1\text{-}C_{50})$hydrocarbyl groups. At least one of the $(C_1\text{-}C_{50})$hydrocarbyl groups is a $(C_1\text{-}C_{50})$alkyl group and at least one of the surface-bonded hydrophobically-modifying $(C_1\text{-}C_{50})$hydrocarbyl groups is a $(C_6\text{-}C_{50})$aryl group.

14 Claims, No Drawings

CURABLE RESIN INCLUDING NANOPARTICLES INCLUDING SURFACE-BONDED HYDROPHOBICALLY-MODIFYING ALKYL GROUPS

CROSS REFERENCE TO RELATED APPLICATIONS

This application is a national stage filing under 35 U.S.C. 371 of PCT/US2017/056934, filed 17 Oct. 2017, which claims the benefit of U.S. Provisional Application No. 62/418,368, filed 7 Nov. 2016, the disclosures of which are incorporated by reference in their entirety herein.

BACKGROUND

Nanoparticle-enhanced thermoset resins have wide-ranging applications including fiber composites, sporting goods, jet engine parts, automotive parts, compressed gas cylinders, and compositions. One of the drivers for exploring the use of the nanoparticle resin modification is the enhanced strength/stiffness that is provided to composite parts using such resins, allowing for production of light-weight composite parts.

The increased use of nanoparticle-enhanced resins in high temperature environments, such as those encountered in aerospace and transportation applications, has re-invigorated research related to mechanical property retention and performance under hot/wet conditions.

SUMMARY OF THE INVENTION

In various embodiments, the present invention provides a resin component. The resin component includes a curable resin. The resin component includes nanoparticles dispersed in the resin. The nanoparticles each independently include surface-bonded hydrophobically-modifying ($C_1$-$C_{50}$)hydrocarbyl groups. At least one of the ($C_1$-$C_{50}$)hydrocarbyl groups is a ($C_1$-$C_{50}$)alkyl group and at least one of the surface-bonded hydrophobically-modifying ($C_1$-$C_{50}$)hydrocarbyl groups is a ($C_6$-$C_{50}$)aryl group.

In various embodiments, the present invention provides a resin system. The resin system includes the resin component. The resin system also includes a curative component.

In various embodiments, the present invention provides a method of forming the resin system. The method includes combining the resin component with the curable component to form the resin system.

In various embodiments, the present invention provides a cured product of the resin system.

In various embodiments, the present invention provides a method of forming the cured product. The method includes curing a reaction mixture including the resin system. Curing the reaction mixture forms the cured product of the resin system.

In various embodiments, the present invention provides an article including the cured product of the resin system.

In various embodiments, the present invention provides a resin component including an epoxy resin. The epoxy resin is about 35 wt % to about 90 wt % of the resin component. The resin component includes nanoparticles dispersed in the resin. The nanoparticles have a particle size of about 5 nm to about 500 nm. The nanoparticles are about 15 wt % to about 65 wt % of the resin component. The nanoparticles each independently include surface-bonded hydrophobically-modifying ($C_1$-$C_{50}$)hydrocarbyl groups. At least some of the ($C_1$-$C_{50}$)hydrocarbyl groups are chosen from a phenyl group and a ($C_1$-$C_{10}$)alkyl group, wherein the mole ratio of the phenyl group to the ($C_1$-$C_{10}$)alkyl group is about 95:5 to about 50:50.

In various embodiments, the resin component, resin systems including the same, and cured products thereof can have certain advantages over other curable materials and cured products thereof. For example, in various embodiments, the resin component of the present invention can have increased shelf life as compared to other resin components, such as by substantially maintaining its viscosity for a longer period of time than other curable resins. In various embodiments, the resin system of the present invention can have lower viscosity than other resin systems, such that the resin system is processable and is suitable for resin transfer molding, filament winding, tow placement, resin infusion processes, pultrusion, or a combination thereof.

In various embodiments, the resin component contains a modified nanoparticle wherein at least one of the surface-bonded groups is selected to increase compatibility of the nanoparticle with the curable portion of the resin component. In some embodiments, the resin component additionally contains a modified nanoparticle wherein a portion of the surface-bonded groups are selected to increase the hydrophobicity of the particle and the resin component.

In some embodiments, wherein the resin component contains particles modified with one type of surface-bonded groups to increase compatibility and a second type of surface-bonded groups to increase hydrophobicity, the resin component is characterized by having a viscosity which is sufficiently low to enable processing such as resin transfer molding, filament winding, tow placement, prepregging, resin infusion, pultrusion, and other similar processes.

In various embodiments, the viscosity of the resin component with both types of modifying groups above is equal to, less than, or significantly less than, the viscosity of a similar resin component with only the compatibilizing-type of surface modification.

In various embodiments, the cured product of the present invention can retain its glass transition temperature between relatively dry room temperature conditions and conditions that are hot, wet, or a combination thereof, more effectively than other cured products (e.g., less change in the $T_g$ after moisture exposure). In various embodiments, the cured product of the present invention can absorb a lower weight percent of water from the air as compared to other cured products under the same conditions. In various embodiments, the preservation of the glass transition temperature (e.g., less change in the $T_g$ after moisture exposure) and the rate and amount of water uptake from air are properties of the cured product that can be tuned by varying the type and distribution of the surface-bonded hydrophobically-modifying ($C_1$-$C_{50}$)hydrocarbyl groups, the size of the nanoparticles, or a combination thereof.

DETAILED DESCRIPTION OF THE INVENTION

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%. The term "substantially free of" can mean having a trivial amount of, such that a composition is about 0 wt % to about 5 wt % of the material, or about 0 wt % to about 1 wt %, or about 5 wt % or less, or less than, equal to, or greater than about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less, or about 0 wt %.

The term "organic group" as used herein refers to any carbon-containing functional group. Examples can include an oxygen-containing group such as an alkoxy group, aryloxy group, aralkyloxy group, oxo(carbonyl) group; a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(R)C(O)N(R)$_2$, N(R)C(S)N(R)$_2$, N(COR)COR, N(OR)R, C(=NH)N(R)$_2$, C(O)N(OR)R, and C(=NOR)R, and substituted or unsubstituted (C$_1$-C$_{100}$)hydrocarbyl, wherein R can be hydrogen (in examples that include other carbon atoms) or a carbon-based moiety, and wherein the carbon-based moiety can be substituted or unsubstituted.

The term "substituted" as used herein in conjunction with a molecule or an organic group as defined herein refers to the state in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, and C(=NOR)R, wherein R can be hydrogen or a carbon-based moiety; for example, R can be hydrogen, (C$_1$-C$_{100}$)hydrocarbyl, alkyl, acyl, cycloalkyl, aryl, aralkyl, heterocyclyl, heteroaryl, or heteroarylalkyl; or wherein two R groups bonded to a nitrogen atom or to adjacent nitrogen atoms can together with the nitrogen atom or atoms form a heterocyclyl.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbon atoms or, in some embodiments, from 2 to 8 carbon atoms. Examples include, but are not limited to vinyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "acyl" as used herein refers to a group containing a carbonyl moiety wherein the group is bonded via the carbonyl carbon atom. The carbonyl carbon atom is bonded to a hydrogen forming a "formyl" group or is bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. An acyl group can include 0 to about 12, 0 to about 20, or 0 to about 40 additional carbon atoms bonded to the carbonyl group. An acyl group can include double or triple bonds within the meaning herein. An acryloyl group is an example of an acyl group. An acyl group can also include heteroatoms within the meaning herein. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "aryl" as used herein refers to cyclic aromatic hydrocarbon groups that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, a phenyl group substituted at any one or more of 2-, 3-, 4-, 5-, or 6-positions of the phenyl ring, or a naphthyl group substituted at any one or more of 2- to 8-positions thereof.

The term "heterocyclyl" as used herein refers to aromatic and non-aromatic ring compounds containing three or more ring members, of which one or more is a heteroatom such as, but not limited to, N, O, and S.

The terms "halo," "halogen," or "halide" group, as used herein, by themselves or as part of another substituent, mean, unless otherwise stated, a fluorine, chlorine, bromine, or iodine atom.

The term "hydrocarbon" or "hydrocarbyl" as used herein refers to a molecule or functional group that includes carbon and hydrogen atoms. The term can also refer to a molecule or functional group that normally includes both carbon and hydrogen atoms but wherein all the hydrogen atoms are substituted with other functional groups.

As used herein, the term "hydrocarbyl" refers to a functional group derived from a straight chain, branched, or cyclic hydrocarbon, and can be alkyl, alkenyl, alkynyl, aryl, cycloalkyl, acyl, or any combination thereof. Hydrocarbyl groups can be shown as $(C_a-C_b)$hydrocarbyl, wherein a and b are integers and mean having any of a to b number of carbon atoms. For example, $(C_1-C_4)$hydrocarbyl means the hydrocarbyl group can be methyl ($C_1$), ethyl ($C_2$), propyl ($C_3$), or butyl ($C_4$), and $(C_0-C_b)$hydrocarbyl means in certain embodiments there is no hydrocarbyl group.

The term "cure" as used herein refers to exposing to radiation in any form, heating, or allowing to undergo a physical or chemical reaction that results in hardening or an increase in viscosity. A thermoset material can be cured by heating or otherwise exposing to irradiation such that the material hardens.

The term "solvent" as used herein refers to a liquid that can dissolve a solid, liquid, or gas. Non-limiting examples of solvents are silicones, organic compounds, water, alcohols, ionic liquids, and supercritical fluids.

The term "room temperature" as used herein refers to a temperature of about 15° C. to 28° C.

As used herein, the term "polymer" refers to a molecule having at least one repeating unit and can include copolymers.

Resin Component.

In various embodiments, the present invention provides a resin component. The resin component includes a curable resin, such as a thermoset resin. The resin component also includes nanoparticles. The nanoparticles are substantially homogeneously dispersed in the resin component. The nanoparticles each independently include surface-bonded hydrophobically-modifying $(C_1-C_{50})$hydrocarbyl groups. At least one of the $(C_1-C_{50})$hydrocarbyl groups is a $(C_1-C_{50})$ alkyl group. In some embodiments, the resin component can also include nanoparticles that are free of hydrophobic modification, that have a different modification, or can be free of nanoparticles other than the nanoparticles including the surface-bonded hydrophobically-modifying $(C_1-C_{50})$hydrocarbyl groups.

The resin component can include one curable resin or more than more curable resin. The one or more curable resins can be any suitable proportion of the resin component, such that the resin component can be used as described herein. The one or more curable resins can be about 35 wt % to about 99 wt % of the resin component, about 35 wt % to about 90 wt %, about 35 wt % to about 60 wt %, about 35 wt % or less, or less than, equal to, or greater than about 36 wt %, 37, 38, 39, 40, 41, 42, 43, 44, 45, 46, 47, 48, 49, 50, 51, 52, 53, 54, 55, 56, 57, 58, 59, 60, 62, 64, 66, 68, 70, 72, 74, 76, 78, 80, 82, 84, 86, 88, 90, 92, 94, 96, 98, wt %, or about 99 wt % or more.

The curable resin can be an epoxy resin, a curable imide resin (e.g., maleimide resins, but also including, for example, commercial K-3 polyamides (available from DuPont) and polyimides having a terminal reactive group such as acetylene, diacetylene, phenylethynyl, norbornene, nadimide, or benzocyclobutane), a vinyl ester resin, an acrylic resin (e.g., (meth)acrylic esters or amides of polyols, epoxies, and amines), a bisbenzocyclobutane resin, a polycyanate ester resin, a diglycidyl ether of a bisphenol, or a combination thereof. The curable resins can be utilized in the form of monomers or prepolymers.

Epoxy resins are well-known in the art and include compounds or mixtures of compounds which contain one or more epoxy groups. The compounds can be saturated or unsaturated, aliphatic, alicyclic, aromatic, or heterocyclic, or can comprise combinations thereof. Compounds which contain more than one epoxy group (e.g., polyepoxides) can be used.

Polyepoxides can include aliphatic or aromatic polyepoxides. Aromatic polyepoxides can be used, for example, for high temperature applications, Aromatic polyepoxides are compounds containing at least one aromatic ring structure (e.g. a benzene ring) and more than one epoxy group, such as polyglycidyl ethers of polyhydric phenols (e.g., bisphenol A derivative resins, epoxy cresol-novolac resins, bisphenol F derivative resins, epoxy phenol-novolac resins), glycidyl esters of aromatic carboxylic acids, and glycidyl amines of aromatic amines. An aromatic polyepoxide can be a polyglycidyl ether of a polyhydric phenol. Aromatic polyepoxides can include glycidyl esters of aromatic carboxylic acids, for example, phthalic acid diglycidyl ester, isophthalic acid diglycidyl ester, trimellitic acid triglycidyl ester, and pyromellitic acid tetraglycidyl ester, and mixtures thereof; N-glycidylaminobenzenes, for example, N,N-diglycidylbenzeneamine, bis(N,N-diglycidyl-4-aminophenyl)methane, 1,3- bis(N,N-diglycidylamino)benzene, and N,N-diglycidyl-4-glycidyloxybenzeneamine, and mixtures thereof; and the polyglycidyl derivatives of polyhydric phenols, for example, 2,2-bis-[4-(2,3-epoxypropoxy)phenyl]propane, the polyglycidyl ethers of polyhydric phenols such as tetrakis(4-hydroxyphenyl)ethane, pyrocatechol, resorcinol, hydroquinone, 4,4'-dihydroxydiphenyl methane, 4,4'-dihydroxydiphenyl dimethyl methane, 4,4'-dihydroxy-3,3'-dimethyldiphenyl methane; 4,4'-dihydroxydiphenyl methyl methane, 4,4'-dihydroxydiphenyl cyclohexane, 4,4'-dihydroxy-3,3'-dimethyldiphenyl propane, 4,4'-dihydroxydiphenyl sulfone, and tris-(4-hydroxyphenyl)methane, polyglycidyl ethers of novolacs (reaction products of monohydric or polyhydric phenols with aldehydes in the presence of acid catalysts), and mixtures thereof. The polyglycidyl ethers of polyhydric phenols can be the diglycidyl ethers of bisphenol that have pendant carbocyclic groups, such as 2,2-bis[4-(2,3-epoxypropoxy)phenyl]norcamphane, 2,2-bis[4-(2,3-epoxypropoxy)phenyl]decahydro-1,4,5,8-dimethanonaphthalene, or 9,9-bis[4-(2,3-epoxypropoxy)phenyl]fluorene.

Aliphatic polyepoxides can include 3',4'-epoxycyclohexylmethyl-3,4-epoxycyclohexanecarboxylate, 3,4-epoxycyclohexyloxirane, 2-(3',4'-epoxycyclohexyl)-5,1"-spiro-3", 4"-epoxycyclohexane-1,3-dioxane, bis(3,4-epoxycyclohexylmethyl)adipate, the diglycidyl ester of linoleic dimer acid, 1,4-bis(2,3-epoxypropoxy)butane, 4-(1,2-epoxyethyl)-1,2-epoxycyclohexane, 2,2-bis(3,4-epoxycyclohexyl)propane, polyglycidyl ethers of aliphatic polyols such as glycerol or fully hydrogenated 4,4'-dihydroxydiphenyl-dimethylmethane, and mixtures thereof.

Maleimide resins can include bismaleimides, polymaleimides, or polyaminobismaleimides, such as N,N'-bismaleimides. The N,N'-bismaleimide can be a N,N'-bismaleimides of 1,2-ethanediamine, 1,6-hexanediamine, trimethyl-1,6-hexanediamine, 1,4-benzenediamine, 4,4'-methylenebisbenzenamine, 2-methyl-1,4-benzenediamine, 3,3'-methylenebisbenzenamine, 3,3'-sulfonylbisbenzenamine, 4,4'-sulfonylbisbenzenamine, 3,3'-oxybisbenzenamine, 4,4'-oxybisbenzenamine, 4,4'-methylenebiscyclohexanamine, 1,3-benzenedimethanamine, 1,4-benzenedimethanamine, 4,4'-cyclohexanebisbenzenamine, and mixtures thereof.

Co-reactants for use with bismaleimides can include any of a wide variety of unsaturated organic compounds, such as those having multiple unsaturation. (e.g., ethylenic, acetylenic, or both). Examples include acrylic acids and amides and the ester derivatives thereof, for example, acrylic acid, methacrylic acid, acrylamide, methacrylamide, and methylmethacrylate; dicyanoethylene; tetracyanoethylene; allyl alcohol; 2,2'-diallylbisphenol A; 2,2'-dipropenylbisphenol A; diallylphthalate triallylisocyanurate; triallylcyanurate; N-vinyl-2-pyrrolidinone; N-vinyl caprolactam; ethylene glycol dimethacrylate; diethylene glycol dimethacrylate; trimethylolpropane triacrylate; trimethylolpropane trimethacrylate; pentaerythritol tetramethacrylate; 4-allyl-2-methoxyphenol; triallyl trimellitate; divinyl benzene; dicyclopentadienyl acrylate; dicyclopentadienyloxyethyl acrylate; 1,4-butanediol divinyl ether; 1,4-dihydroxy-2-butene; styrene; α-methyl styrene; chlorostyrene; p-phenylstyrene; p-methylstyrene; t-butylstyrene; and phenyl vinyl ether. Resins including bismaleimide in combination with a bis(alkenylphenol) can be used, such as 4,4'-bismaleimidodiphenylmethane and o,o'-diallyl bisphenol A.

Polycyanate ester resins can include 1,2-dicyanatobenzene, 1,3-dicyanatobenzene, 1,4-dicyanatobenzene, 2,2'-dicyanatodiphenylmethane, 3,3'-dicyanatodiphenylmethane, 4,4'-dicyanatodiphenylmethane, and the dicyanates prepared from bisphenol A, bisphenol F, or bisphenol S. Tri- and higher functionality cyanate resins can be used.

The resin component can include one type of nanoparticle having the surface-bonded hydrophobically-modifying ($C_1$-$C_{50}$)hydrocarbyl groups or can include more than one type of such nanoparticles. The one or more hydrophobically-modified nanoparticles can form any suitable proportion of the resin component, such as about 1 wt % to about 65 wt % of the resin component, or about 15 wt % to about 65 wt %, or about 1 wt % or less, or less than, equal to, or greater than about 2 wt %, 4, 6, 8, 10, 12, 14, 15, 16, 18, 20, 22, 24, 26, 28, 30, 32, 34, 36, 38, 40, 41, 42, 43, 44, 45, 46, 47, 48, 49, 50, 51, 52, 53, 54, 55, 56, 57, 58, 59, 60, 61, 62, 63, 64, 64 wt %, or about 65 wt % or more.

The nanoparticles can include any suitable material, such as silica, titania, alumina, zirconia, vanadia, chromia, iron oxide, antimony oxide, tin oxide, calcium carbonate, calcite, or a combination thereof. The nanoparticles can be silica nanoparticles, and in some embodiments can be substantially free of materials other than silica. In some embodiments, the resin component can be formed by combining the curable resin with a sol including the nanoparticles and a solvent, followed by evaporation of the solvent.

The nanoparticles can have any suitable particle size (e.g., largest dimension of the particle), such as about 1 nm to less than about 1,000 nm, about 5 nm to about 500 nm, about 10 nm to about 200 nm, or about 1 nm or less, or less than, equal to, or greater than about 2, 3, 4, 5, 6, 8, 10, 12, 14, 16, 18, 20, 25, 30, 35, 40, 45, 50, 55, 60, 65, 70, 75, 80, 85, 90, 95, 100, 102, 104, 106, 108, 110, 112, 114, 116, 118, 120, 122, 124, 126, 128, 130, 132, 134, 136, 138, 140, 142, 144, 146, 148, 150, 152, 154, 156, 158, 160, 165, 170, 175, 180, 185, 190, 195, 200, 210, 220, 230, 240, 250, 275, 300, 325, 350, 375, 400, 450, 500, 550, 600, 700, 800, 900 nm, or less than about 1000 nm. The particle size can be measured in any suitable way, such as via transmission electron microscopy (TEM). In some embodiments, the nanoparticles have one average particle sizes. In some embodiments, the nanoparticles are distributed across multiple particle sizes such that the nanoparticles have more than one average particle size, such as at least two average particle sizes. For example, a first average particle size can be about 1 nm to less than about 1,000 nm, about 5 nm to about 500 nm, about 10 nm to about 200 nm, or about 1 nm or less, or less than, equal to, or greater than about 2, 3, 4, 5, 10, 20, 30, 40, 50, 75, 100, 125, 150, 175, 200, 225, 250, 275, 300, 350, 400, 450, 500, 600, 700, 800, 900 nm, or less than about 1000 nm, and a second average particle size can be about 1 nm to less than about 1,000 nm, about 5 nm to about 500 nm, about 10 nm to about 200 nm, or about 1 nm or less, or less than, equal to, or greater than about 2, 3, 4, 5, 10, 20, 30, 40, 50, 75, 100, 125, 150, 175, 200, 225, 250, 275, 300, 350, 400, 450, 500, 600, 700, 800, 900 nm, or less than about 1000 nm.

The nanoparticles can include one surface-bonded hydrophobically-modifying ($C_1$-$C_{50}$)hydrocarbyl group or multiple such groups. At least one of the surface-bonded hydrophobically-modifying ($C_1$-$C_{50}$)hydrocarbyl groups can be a ($C_6$-$C_{50}$)aryl group, or a phenyl group. The ($C_1$-$C_{50}$)alkyl surface-bonded hydrophobically-modifying ($C_1$-$C_{50}$)hydrocarbyl group can be a ($C_1$-$C_{10}$)alkyl group. The surface-bonded hydrophobically-modifying ($C_1$-$C_{50}$)alkyl group can be a methyl, ethyl, or isooctyl group.

The surface-bonded hydrophobically-modifying ($C_1$-$C_{50}$) hydrocarbyl groups can be derived from any suitable material, such as from monohydric alcohols, polyols, organosilanes, organotitanates, or combinations thereof. The surface-bonded hydrophobically-modifying ($C_1$-$C_{50}$)hydrocarbyl group can be bonded to the nanoparticle via a —SiR$^1$R$^2$— linker, such that the nanoparticle (NP) and the hydrophobically modifying (C$_1$-C$_{50}$)hydrocarbyl group (G) have the structure NP—SiR$^1$R$^2$-G, wherein R$^1$ and R$^2$ are chosen from a (C$_1$-C$_{15}$)alkyl group, a (C$_1$-C$_{15}$)alkoxy group, a (C$_6$-C$_{18}$)aryl group, and an —O—C(O)—(C$_1$-C$_{15}$)alkane group.

The modified nanoparticles including the surface-bonded hydrophobically-modifying (C$_1$-C$_{50}$)hydrocarbyl groups can be formed by reacting unmodified nanoparticles with a silane having the structure:

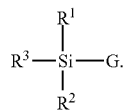

R$^1$, R$^2$, and R$^3$ can be independently chosen to provide surface functionalization or to form a bond to the nanoparticle. R$^1$, R$^2$, and R$^3$ can be independently chosen from a (C$_1$-C$_{15}$)alkyl group, a (C$_1$-C$_{15}$)alkoxy group, a (C$_6$-C$_{18}$) aryl group, and an —O—C(O)—(C$_1$-C$_{15}$)alkane group, wherein at least one of R$^1$, R$^2$, and R$^3$ is a (C$_1$-C$_{15}$)alkoxy group or an —O—C(O)—(C$_1$-C$_{15}$)alkane group. G can be the hydrophobically-modifying (C$_1$-C$_{50}$)hydrocarbyl group. The nanoparticle including the surface-bonded hydrophobically-modifying (C$_1$-C$_{50}$)hydrocarbyl group can be formed via treatment of the nanoparticle with phenyltrimethyloxysilane, diphenyldimethoxysilane, triphenylmethoxysilane, isooctyltrimethoxysilane, diisooctyldimethoxysilane, triisooctylmethoxysilane, methyltrimethoxysilane, dimethyldimethoxysilane, trimethylmethoxysilane, phenyltriacetoxysilane, diphenyldiacetoxysilane, triphenylacetoxysilane, ethyltriacetoxysilane, diethyldiacetoxysilane, triethylacetoxysilane, methyltriacetoxysilane, dimethyldiacetoxysilane, trimethylacetoxysilane, isooctyltriacetoxysilane, diisooctylacetoxysilane, triisooctylacetoxysilane, similar silane materials, or a combination thereof.

The surface-bonded hydrophobically-modifying (C$_1$-C$_{50}$) hydrocarbyl groups can include one kind of the (C$_1$-C$_{50}$) hydrocarbyl groups, or can include a blend of more than one kind of the (C$_1$-C$_{50}$)hydrocarbyl groups. For example, the surface-bonded hydrophobically-modifying (C$_1$-C$_{50}$)hydrocarbyl groups can include a blend of a (C$_6$-C$_{50}$)aryl group and a (C$_1$-C$_{50}$)alkyl group, such as a blend of a phenyl group and a (C$_1$-C$_{10}$)alkyl group (e.g., methyl, ethyl, or isooctyl). The surface-bonded hydrophobically-modifying (C$_6$-C$_{50}$) aryl groups and the surface-bonded hydrophobically-modifying (C$_1$-C$_{50}$)alkyl groups can have a mole ratio of about 99:1 to about 1:99, about 95:5 to about 50:50, about 90:10 to about 70:30, or about 99:1 or more, or less than, equal to, or greater than about 95:5, 90:10: 88:12, 86:14, 84:16, 82:18, 80:20, 78:22, 76:24, 74:26, 72:28, 70:30, 65:35, 60:40, 55:45, 50:50, 45:55, 40:60, 35:65, 30:70, 25:75, 20:80, 15:85, 10:90, 5:95, or about 1:99 or less.

The resin component including the nanoparticles with surface-bonded hydrophobically-modifying (C$_1$-C$_{50}$)hydrocarbyl groups including a blend of a (C$_6$-C$_{50}$)aryl group and a (C$_1$-C$_{50}$)alkyl group can have any number of suitable properties. For example, a cured product of the resin component and a curative component can absorb a smaller amount of moisture over a given time period as compared to a cured product of a corresponding resin component having a lower mole ratio of the (C$_1$-C$_{50}$)alkyl group to the (C$_6$-C$_{50}$)aryl group and the curative component over the same time period and under the same conditions. In some embodiments, a cured product of the resin component and a curative component can have a change in glass transition temperature between the two conditions of after drying for 10 days at 80° C. air at ambient humidity (e.g., uncontrolled humidity conditions) and after exposure to 85% humidity air at 85° C. for 10 days that is smaller than the depression or reduction in glass transition temperature observed for a cured product of a corresponding resin component having a lower mole ratio of the (C$_1$-C$_{50}$)alkyl group to the (C$_6$-C$_{50}$)aryl group and the curative component between the same two conditions. A cured product of the resin component and a curative component can have a higher glass transition temperature after drying for 10 days at 80° C. air at low humidity as compared to the glass transition temperature observed for a cured product of a corresponding resin component having a lower mole ratio of the (C$_1$-C$_{50}$)alkyl group to the (C$_6$-C$_{50}$) aryl group and the curative component under the same conditions. A cured product of the resin component and a curative component can have a higher glass transition temperature after exposure to 85% humidity air at 85° C. for 10 days as compared to the glass transition temperature observed for a cured product of a corresponding resin component having a lower mole ratio of the (C$_1$-C$_{50}$)alkyl group to the (C$_6$-C$_{50}$)aryl group and the curative component under the same conditions.

In various embodiments, the nanoparticles, the curable resin, the resin component, the resin system, or a combination thereof, can be substantially free of inorganic water-soluble salts, such as KOH, NaOH, NH$_4$OH, or a combination thereof. Such salts can result from ion-exchange processes. In some embodiments, the presence of such salts can cause an increase in viscosity.

Resin System.

In various embodiments, the present invention provides a resin system. The resin system includes the resin component and a curative component. The resin component can be any suitable embodiment of the resin component described herein, for example, including a curable resin and nanoparticles dispersed in the resin each independently including surface-bonded hydrophobically-modifying (C$_1$-C$_{50}$)hydrocarbyl groups, with at least one of the (C$_1$-C$_{50}$)hydrocarbyl groups being a (C$_1$-C$_{50}$)alkyl group.

The resin system is a curable system; for example, the resin component and the curative component can be cured together to form a cured product thereof when placed under suitable conditions. The resin system can be a thermoset resin system, wherein heating of the resin system can cause the resin system to cure. The resin system can be substantially homogeneously mixed, such that the resin component and the curative component are substantially homogeneously mixed.

The nanoparticles with surface-bonded hydrophobically-modifying (C$_1$-C$_{50}$)hydrocarbyl groups can form any suitable proportion of the resin system. For example, the nanoparticles can be about 1 wt % to about 80 wt % of the resin system, about 15 wt % to about 50 wt %, about 20 wt % to about 45 wt %, or about 1 wt % or less, or less than, equal to, or greater than about 2 wt %, 3, 4, 5, 6, 8, 10, 12, 14, 16, 18, 20, 22, 24, 26, 28, 30, 32, 34, 36, 38, 40, 42, 44, 46, 48, 50, 55, 60, 65, 70, 75 wt %, or about 80 wt % or more.

The resin component can be any suitable proportion of the resin system. The resin component can be about 1 wt % to about 99 wt % of the resin system, about 60 wt % to about 90 wt % of the resin system, or about 1 wt % or less, or less than, equal to, or greater than about 2 wt %, 3, 4, 5, 6, 8, 10, 15, 20, 25, 30, 35, 40, 45, 50, 55, 60, 62, 64, 66, 68, 70, 72, 74, 76, 78, 80, 85, 90, 95, 96, 97, 98 wt %, or about 99 wt % or more.

The curative component can form any suitable proportion of the resin system. The curative component can be about 1 wt % to about 99 wt % of the resin system, about 3 wt % to about 55 wt %, or about 1 wt % or less, or less than, equal to, or greater than about 2 wt %, 3, 4, 5, 6, 8, 10, 15, 20, 22, 24, 26, 28, 30, 32, 34, 36, 38, 40, 45, 50, 55, 60, 65, 70, 75, 80, 85, 90, 95, 96, 97, 98 wt %, or about 99 wt % or more of the resin system. The curative component can be present in an amount of about 0.1 to about 2 times a stoichiometric amount of the curable resin (e.g., wherein a 1:1 ratio is the amount of curative component such that all non-catalytic components thereof react completely with the resin component leaving substantially no excess resin component behind), such as about 0.1 times a stoichiometric amount of the curable resin or less, or less than, equal to, or greater than 0.2, 0.3, 0.4, 0.5, 0.6, 0.7, 0.8, 0.9, 1.0, 1.1, 1.2, 1.3, 1.4, 1.5, 1.6, 1.7, 1.8, or about 1.9 or more.

The curative component can include any suitable component that can cure with (e.g., react with or catalyze to form a hardened material) the resin component. The curative component can include a curing agent, a catalyst, a crosslinker, or a combination thereof. In some embodiments, the curing agent, crosslinker, or combination thereof can substantially form the entirety of the curative component, while in other embodiments other materials can be present in the curative component. In some embodiments, the curative component can include an anhydride, an amine curing agent, an amide curing agent, a polycarboxylic acid, a polyphenol, or a combination thereof. The curative component can include a substituted or unsubstituted phthalic anhydride, a hydrogenated derivative of a substituted or unsubstituted phthalic anhydride, a dicyandiamide, a diaminodiphenylsulfone, or a combination thereof.

Epoxy resin curing agents can include an anhydride such as a substituted or unsubstituted phthalic anhydride, a hydrogenated derivative of a substituted or unsubstituted phthalic anhydride, or chlorendic anhydride; an amine curing agent such as ethylenediamine, diethylenetriamine, aminoethylethanolamine, and the like, diaminodiphenylsulfone, 9,9-bis(4-aminophenyl)fluorene, 9,9-bis(3-chloro-4-(aminophenyl)fluorene; an amide curing agent such as dicyandiamide; a polycarboxylic acid such as adipic acid; a polyphenol such as bisphenol A; or a combination thereof. Examples of curing agents can include those disclosed in U.S. Pat. No. 4,684,678 (Schultz et al.), which is hereby incorporated by reference as if reproduced herein in its entirety.

N,N'-bismaleimide resins can be cured using diamine curing agents, or by other mechanisms, e.g., co-cure with aromatic olefins (such as bis-allylphenyl ether, 4,4'-bis(o-propenylphenoxy)benzophenone, or o,o'-diallyl bisphenol A) or thermal cure via a self-polymerization mechanism. Polycyanate resins can be crosslinked by application of heat and/or by using catalysts such as zinc octoate, tin octoate, zinc stearate, tin stearate, copper acetylacetonate, or chelates of iron, cobalt, zinc, copper, manganese, and titanium with bidentate ligands such as catechol.

The viscosity of the resin system can be suitable for preparation of a composite article via a process requiring a low viscosity resin system, such as via resin transfer molding, filament winding, tow placement, resin infusion processes, pultrusion, or a combination thereof. The viscosity of the resin system can be any suitable viscosity. For example, after mixing at room temperature, the resin system can have a room temperature complex viscosity of about 0.1 Pa·s to about 300 Pa·s, about 1 Pa·s to about 100 Pa·s, or about 0.1 Pa·s or less, or less than, equal to, or greater than about 0.5 Pa·s, 1, 2, 3, 4, 5, 6, 7, 8, 9, 10, 12, 14, 16, 18, 20, 25, 30, 35, 40, 45, 50, 60, 70, 80, 90, 100, 110, 120, 130, 140, 150, 160, 170, 180, 190, 200, 210, 220, 230, 240, 250, 260, 270, 280, 290, or about 300 Pa·s or more.

The resin system can include any one or more optional ingredients, or can be free of any one of more optional ingredients. For example, the resin system can optionally include, or be free of, a catalyst, dye, flame retardant, pigment, impact modifier, flow control agent, reactive diluent, de-foamer (e.g., to reduce foam upon mixing or using), a curing accelerator, a catalyst, filler, solvent, urea, or a combination thereof. The catalyst can be a thermally-activated catalytic agent, such as a Lewis acid or base, tertiary or quaternary amine, imidazole, complexed Lewis acid, or organometallic compounds or salts thereof.

The resin system can have any water content which enables the cured parts to adequately perform in the end-use application. Understanding that water content can affect the $T_g$, the performance considerations can include the maintenance of an adequate $T_g$ to preserve the necessary strength and modulus for the end-use application. The cured resin system can be substantially free of water. The cured resin system can have a water content of less than or equal to about 5 wt % of the resin system, or about 0 wt % to about 2 wt %, or about 0 wt %, or about 0.1 wt % or less, or less than, equal to, or greater than about 0.2, 0.3, 0.4, 0.5, 0.6, 0.8, 1, 1.2, 1.4, 1.6, 1.8, 2, 2.5, 3, 3.5, 4, or 4.5 wt %.

Method of Forming the Resin System.

In various embodiments the present invention provides a method of forming the resin system. The method can be any suitable method that forms an embodiment of a resin system disclosed herein, such as including a resin component and a curative component, wherein the resin component includes a curable resin and nanoparticles dispersed in the resin each independently including surface-bonded hydrophobically-modifying ($C_1$-$C_{50}$)hydrocarbyl groups, with at least one of the ($C_1$-$C_{50}$)hydrocarbyl groups being a ($C_1$-$C_{50}$)alkyl group.

The method can include combining the resin component with the curable component to for the resin system. The method can include mixing the resin component and the curable component such that the resin component and the curable component are substantially homogeneously mixed.

Cured Product of the Resin System.

In various embodiments the present invention provides a cured product of the resin system. The cured product can be any suitable cured product of an embodiment of the resin system described herein, such as a cured product of a resin system including a resin component and a curative component, wherein the resin component includes a curable resin and nanoparticles dispersed in the resin each independently including surface-bonded hydrophobically-modifying ($C_1$-$C_{50}$)hydrocarbyl groups, with at least one of the ($C_1$-$C_{50}$)hydrocarbyl groups being a ($C_1$-$C_{50}$)alkyl group.

The cured product of the resin system can have any suitable properties consistent with the compositions of the resin systems described herein. For example, after exposure to 85° C. air with 85% humidity after 11 days the total moisture uptake can be about 0 wt % to about 3 wt %, or about 1.5 wt % to about 2.5 wt %, or about 0 wt %, or about 0.1 wt % or less, or less than, equal to, or greater than about 0.2 wt %, 0.3, 0.4, 0.5, 0.6, 0.8, 1, 1.2, 1.4, 1.5, 1.6, 1.7, 1.8, 1.9, 2.0, 2.1, 2.2, 2.3, 2.4, 2.5, 2.6, 2.8, or about 3 wt % or more.

The glass transition temperature of the cured product of the resin system can have better retention under hot and wet conditions as compared to other resin systems. For example, a change in glass transition temperature of the cured product between conditions of after 10 days at 80° C. air at ambient humidity (e.g., uncontrolled humidity) and after exposure to 85% humidity air at 85° C. for 10 days can be about 10° C. to about 60° C., or about 25° C. to about 40° C., or about 10° C. or less, or less than, equal to, or greater than about 15° C., 20, 25, 26, 28, 30, 32, 34, 36, 38, 40, 45, 50, 55° C., or about 60° C. or more.

The cured product of the resin system can have any suitable water content. The cured product of the resin system can be substantially free of water. The cured product of the resin system can have a water content of less than or equal to about 5 wt % of the cured product, or about 0 wt % to about 2 wt %, or about 0 wt %, or about 0.1 wt % or less, or less than, equal to, or greater than about 0.2, 0.3, 0.4, 0.5, 0.6, 0.8, 1, 1.2, 1.4, 1.6, 1.8, 2, 2.5, 3, 3.5, 4, or 4.5 wt %.

Method of Forming the Cured Product.

In various embodiments, the present invention provides a method of forming the cured product. The method can be any suitable method that forms an embodiment of the cured product formed herein, for example, a cured product of a resin system including a resin component and a curative component, wherein the resin component includes a curable resin and nanoparticles dispersed in the resin each independently including surface-bonded hydrophobically-modifying ($C_1$-$C_{50}$)hydrocarbyl groups, with at least one of the ($C_1$-$C_{50}$)hydrocarbyl groups being a ($C_1$-$C_{50}$)alkyl group.

The method can include mixing at least the resin component and the curative component to form the reaction mixture. The resin system can be a thermoset resin system, and curing the reaction mixture including the resin system can include heating the reaction mixture. The resin system can have a low viscosity such that it is readily processable via various techniques during formation of the cured product. The resin system can be of sufficiently high viscosity and have an appropriate rheological profile with temperature such that it is readily processable into a pre-preg (or a fabric which is pre-impregnated with the resin system). The curing can include application of heat, electron beam radiation, microwave radiation, ultraviolet or visual radiation, or a combination thereof.

The method of forming the cured product can include a resin transfer molding process. Fibers can be first shaped into a preform which can then be compressed to final part shape in a metal mold. The resin system can then be pumped into the mold and heat-cured.

The method of forming the cured product can include a filament winding process, which is typically used to prepare cylinders or other composites having a circular or oval cross-sectional shape. In this process, a fiber tow or an array of tows is impregnated with the resin system by running it through a resin system bath and then winding the impregnated tow onto a mandrel. The resulting composite can then be heat-cured.

The method of forming the cured product can include a pultrusion process. Pultrusion is a continuous process used to prepare constant cross-section parts. The method can include wetting out a large array of continuous fibers in a bath of the resin system, then pulling the resulting wet array through a heated die, where trapped air is squeezed out and the resin system is cured.

The method of forming the product can include forming a pre-preg (or a fabric which is pre-impregnated with the resin system), which is subsequently shaped and cured.

Article.

In various embodiments, the present invention provides an article including the cured product. The article can be any suitable article that includes an embodiment of the cured product described herein, for example, a cured product of a resin system including a resin component and a curative component, wherein the resin component includes a curable resin and nanoparticles dispersed in the resin each independently including surface-bonded hydrophobically-modifying ($C_1$-$C_{50}$)hydrocarbyl groups, with at least one of the ($C_1$-$C_{50}$)hydrocarbyl groups being a ($C_1$-$C_{50}$)alkyl group.

The article can include a composite including fibers impregnated with the cured product. The article can include a substrate including a coating that includes the cured product.

An article including fibers can include any suitable type of fibers, such as organic or inorganic fibers, for example, carbon or graphite fibers, glass fibers, ceramic fibers, boron fibers, silicon carbide fibers, polyimide fibers, polyamide fibers, polyethylene fibers, and the like, and combinations thereof. Fibers of carbon, glass, or polyamide are can be used and can have advantages including low cost, good physical properties, and facile processing. Such fibers can be in the form of a unidirectional array of individual continuous fibers, woven fabric, knitted fabric, yarn, roving, braided constructions, or non-woven mat. Generally, a composite article can contain, e.g., about 30 vol % to about 80 vol % fibers, or about 45 vol % to about 70 vol % fibers, depending upon structural application requirements.

EXAMPLES

Various embodiments of the present invention can be better understood by reference to the following Examples which are offered by way of illustration. The present invention is not limited to the Examples given herein.

Unless otherwise noted, all reagents were obtained or are available from Sigma-Aldrich Company, St. Louis, Mo., or may be synthesized by known methods. Unless otherwise reported, all ratios are by weight percent.

Table 1 describes abbreviations used in the Examples. Table 2 describes materials used in the Examples.

TABLE 1

| Abbreviations used in the Examples: | |
|---|---|
| Abbreviation | Meaning |
| ° C. | degrees Centigrade |
| ° F. | degrees Fahrenheit |
| cm | centimeters |
| DMA | dynamic mechanical analysis |
| HP | horsepower |
| KPa | kilo Pascal |
| KW | kilowatt |
| L | liter |
| ml/min | milliliter per minute |
| mm | millimeter |
| μm | micrometer |
| nm | nanometer |
| pbw | parts by weight |
| psi | pounds per square inch |
| rpm | revolutions per minute |
| $T_g$ | glass transition temperature |
| TGA | thermogravimetric analysis |
| wt % | weight percent |

TABLE 2

Materials used in the Examples.

| Abbreviation | Material |
| --- | --- |
| 1M2P | 1-Methoxy-2-propanol, obtained from Sigma-Aldrich Company |
| BA | Butylacetate, obtained from Sigma-Aldrich Company |
| BYK | Defoamer, obtained under the trade designation "BYK-1790" from Byk USA, Inc., Wallingford, Connecticut |
| DC-1400B | A micronized dicyandiamide curative, obtained under the trade designation "DICYANEX 1400B" from Air Products and Chemicals, Allentown, Pennsylvania |
| DMeDMS | Dimethyl dimethoxy silane, obtained from Gelest, Inc., Morrisville, Pennsylvania |
| EPON826 | Bisphenol-A epoxy resin, obtained under the trade designation "EPON 826" from Hexion Specialty Chemicals, Houston, Texas |
| EPON 862 | Diglycidyl ether of bisphenol F low viscosity epoxy resin with an approximate epoxy equivalent weight of between 165-173 grams/equivalent, obtained under the trade designation "EPON-862" from Hexion Specialty Chemicals |
| EtTAS | Ethyltriacetoxy silane, obtained from Gelest, Inc. |
| H107 | Cyclohexane dimethanol diglycidyl ether, obtained under the trade designation "HELOXY 107" from Hexion Specialty Chemicals |
| IOTMS | A mixture of isomeric octyltrimethoxy-silanes, with isooctyltrimethoxysilane as the main component, obtained under the trade designation "SILRES BS 1316" from Wacker Chemie AG, Munich, Germany |
| IR-120 | An acidic cation ion exchange resin, obtained under the trade designation "AMBERLITE IR-120" from Dow Chemical Company, Midland, Michigan |
| MeTAS | Methyltriacetoxy silane, obtained from Gelest, Inc. |
| NP1A | A silica nanoparticle sol, nominally 75 nm diameter, obtained under the trade designation "NALCO 2329K" from Nalco Chemical Company, Naperville, Illinois |
| NP1B | A silica nanoparticle sol, nominally 74 nm diameter, obtained under the trade designation "NALCO 2329K" from Nalco Chemical Company |
| NP1C | A silica nanoparticle sol, nominally 76 nm diameter, obtained under the trade designation "NALCO 2329K" from Nalco Chemical Company |
| NP1D | A silica nanoparticle sol, nominally 72 nm diameter, obtained under the trade designation "NALCO 2329K" from Nalco Chemical Company |
| NP1E | A silica nanoparticle sol, nominally 77 nm diameter, obtained under the trade designation "NALCO 2329K" from Nalco Chemical Company |
| NP2A, NP2B, NP2C | Silica nanoparticle sols, various lots of nominally 20-30 nm diameter, obtained under the trade designation "NALCO 2327" from Nalco Chemical Company |
| PTMS | Phenyltrimethoxysilane, obtained from Gelest, Inc. |
| TX-15502 | A 46 wt % solids, 140 nm, sodium stabilized aqueous silica sol, obtained under the trade designation "TX-15502" from Nalco Chemical Company |
| U-24 | An aromatic substituted urea, obtained under the trade designation "OMICURE U-24", from CVC Thermoset Specialties, Moorestown, New Jersey |
| L36V | A methyltetrahydrophthalic anhydride/ methylhexahydrophthalic anhydride curative, obtained under the trade designation "Lindride 36V" from Lindau Chemicals, Inc., Columbia, South Carolina |
| L36Y | A methyltetrahydrophthalic anhydride/ methylhexahydrophthalic anhydride curative, obtained under the trade designation "Lindride 36Y" from Lindau Chemicals, Inc. |

Example 1

A master batch of IR-120 was rinsed with deionized water at 21° C. until the eluent water was clear. The resulting cleaned ion exchange resin was then maintained at an approximately 90 wt % aqueous suspension.

400 grams TX-15502 was added to a 3-necked flask fitted with stirrer, condenser, thermo-watch and thermometer at 21° C. The silica sol was continuously stirred while incrementally adding 20.3 grams of the IR-120 suspension over 4 minutes in order to deionize the silica sol and reduce the pH to around 2.5. Once at a pH of 2.5, solution was stirred for 45 minutes then the IR-120 was filtered off from the silica sol. The acidic sol was then transferred to a 3 neck flask and while stirring, 1.46 grams of a 30% wt % ammonium hydroxide solution was quickly added to bring the pH up to 9.50. After addition of ammonium hydroxide, stirring was quickly continued for a minimum of 5 minutes to ensure no gelation of the sol occurred. 400 grams 1-methoxy-2-propanol was combined with 2.7 grams PTMS and 0.36 grams IOTMS, corresponding to a mole ratio of 90:10 phenyltrimethoxysilane:isomeric octyltrimethoxysilanes, and the mixture slowly added to the stirred sol over 10 minutes. With continuous stirring, the contents of the flask was heated to between 90-95° C., held for at this temperature for 20 hours, then cooled to 21° C. The resulting silane modified silica sol was subsequently determined to be 23.8 wt % silica.

220.0 grams of this modified sol was transferred to a flask fitted with a stirrer and vacuum take-off 57.5 grams Epon 862 was added and the mixture heated to 85-90° C., with continuous stirring under vacuum, until approximately 90% of the volatiles were removed. The temperature was then increased to 150° C. and held for 45 minutes and finally cooled to 21° C. The resulting silica concentration in the resulting nanosilica filled epoxy was subsequently determined to be 46.7 wt %.

10 grams of this nanosilica filled epoxy was transferred to a model Flack-Tec 150 high speed mixer. To this was added 0.19 grams DC-1400B and 0.19 grams U-24, and the mixture homogeneously dispersed for 2 minutes at 2,500 rpm. The mixture was then placed in a vacuum oven, degassed for 30 minutes at 50° C., dispersed again for 2 minutes at 2,500 rpm, then transferred to a mold pre-heated to 75° C. The material was then cured for 1 hour at 80° C., followed by 2 hours at 150° C., cooled to 21° C., after which the cured material was removed from the mold.

Example 2

The procedure generally described in Example 1 was repeated, wherein the 2.7 grams of PTMS was reduced to 2.4 grams, and the 0.36 grams IOTMS was increased to 0.71 grams, corresponding to a mole ratio of 80:20 phenyltrimethoxysilane:isomeric octyltrimethpoxysilanes.

Example 3

The procedure generally described in Example 1 was repeated, wherein the 2.7 grams of PTMS was reduced to 2.1 grams, and the 0.36 grams IOTMS was increased to 1.1 grams, corresponding to a mole ratio of 70:30 phenyltrimethoxysilane:isomeric octyltrimethpoxysilanes.

Comparative Examples A-C and Examples 4-11

Functionalized Nanoparticle Sol Preparation (FNP). P 1.120 parts by weight NP1A was added to an open head stainless steel mixing vessel at 70° F. (21.1° C.). Most of 1.0 parts by weight 1M2P was then slowly mixed into to the NP1A by means of a pneumatically driven impeller. Separately, 0.0150 parts by weight PTMS was mixed with the remainder of the 1.0 part by weight 1M2P, after which it was added slowly to the vessel, and mixing continued for another 30 minutes at 70° F. (21.1° C.). This mixture was then fed into a 27-liter stainless steel continuous flow hydrothermal reactor, the known designs of which are described in Adschiri, et al., *J. Am. Ceram. Soc,* 75 (4), 1019-1022 (1992), U.S. Pat. No. 5,453,262 (Dawson, et al.) and PCT published application No. WO 2009/120848 (Tiefenbruck, et al.). Reactor temperature was 150° C., backpressure set 330 psi (2.3 MPa) and the residence time was 35 minutes. The resultant functionalized nanoparticle sol was designated "FNP1A".

The procedure generally described for preparing FNPA1 was repeated, according to the reactor conditions (reactor size, residence time and temperature), nanoparticle sol (type and parts by weight) and silane (types, mole ratio and parts by weight) as listed in Table 3, but in some cases (as noted in Table 3) using a smaller 0.5-liter hydrothermal reactor. The corresponding parts by weight were referenced to 1M2P as being 1.00.

TABLE 3

| FNP Sol Designation | Nanoparticle Sol | | Silane | | | $1^{st}:2^{nd}$ Mole Ratio | Reactor | | |
|---|---|---|---|---|---|---|---|---|---|
| | Type | Parts By Wt. | $1^{st}$. Type | Parts By Wt. | $2^{nd}$. Type | | Size (L) | Temp. (° C.) | Time (min.) |
| FNP1A | NP1A | 1.12 | PTMS | 0.0150 | None | 100/0 | 27 | 150 | 35 |
| FNP1B | NP1B | 1.14 | PTMS | 0.0172 | None | 100/0 | 0.5 | 150 | 35 |
| FNP1C | NP1C | 1.13 | PTMS | 0.0149 | None | 100/0 | 27 | 150 | 35 |
| FNP1D-1 | NP1D | 1.12 | PTMS | 0.0157 | MeTAS | 70/30 | 27 | 150 | 35 |
| FNP1D-2 | NP1D | 1.13 | PTMS | 0.0160 | DMeDMS | 76/24 | 0.5 | 150 | 35 |
| FNP1D-3 | NP1D | 1.13 | PTMS | 0.0112 | MeTAS | 70/30 | 0.5 | 150 | 35 |
| FNP1D-4 | NP1D | 1.13 | PTMS | 0.0123 | MeTAS | 70/30 | 0.5 | 150 | 35 |
| FNP1D-5 | NP1D | 1.13 | PTMS | 0.0135 | MeTAS | 70/30 | 0.5 | 150 | 35 |
| FNP1D-6 | NP1D | 1.13 | PTMS | 0.0147 | MeTAS | 70/30 | 0.5 | 150 | 35 |
| FNP1D-7 | NP1D | 1.13 | PTMS | 0.0160 | MeTAS | 76/24 | 0.5 | 150 | 35 |
| FNP1E | NP1E | 1.06 | PTMS | 0.0110 | EtTAS | 70/30 | 27 | 160 | 20 |
| FNP2A | NP2A | 0.73 | PTMS | 0.0245 | None | 100/0 | 27 | 155 | 35 |
| FNP2B | NP2B | 0.73 | PTMS | 0.0248 | None | 100/0 | 27 | 150 | 35 |
| FNP2C | NP2C | 0.73 | PTMS | 0.0246 | MeTAS | 70/30 | 0.5 | 150 | 35 |

Phase Separation Procedure.
Wiped Film Evaporator (WFE) Feed Compositions.

A feed mixture for Comparative Example A was processed as follows. 4.770 parts by weight FNP1A, 0.653 parts by weight FNP2A and 1.000 parts by weight EPON826 epoxy resin were transferred to a 380 L kettle. The kettle was kept at 25° C. and the components were agitated for 40 minutes, after which agitation was stopped and the feed mixture was allowed to settle for 1 hour. In most cases, phase separation occurred such that there was a clear solvent layer on top and an opaque emulsion layer in the bottom of the kettle. The clear solvent layer was removed by decanting, and weighed. The weight of the decanted material was calculated as a percentage of the original weight of the components added, and is reported in Table 4. After decanting, the amounts of 0.231 parts by weight H107, 0.254 parts by weight BA, were added to the feed mixture, and agitation was resumed for at least 30 minutes. The emulsion layer from the Phase Separation was metered into a WFE using a 1 square meter BUSS FILMTRUDER counter current polymer processor. The WFE rotor was set at a speed of 340 rpm with a 25 HP (18.6 KW) drive and steam zones 1 and 2 at a temperature of 108° C., Zone 3 temperature of 144° C., Zone 4 temperature of 134° C. and a vacuum level of between 3.6-3.9 KPa. After approximately 15 minutes the WFE effluent was isolated as a solvent-free, liquid nanoparticle-containing resin system. The nanoparticle-containing resin system for CE-1 was designated Resin1 as indicated in Table 4. The remainder of the Comparatives and Examples and the correlation to the Resin Number can be found in Table 6.

Comparative Example A and C, and Examples 4 and 5, were prepared as generally described above, according to the conditions listed in Table 4. Parts by weight EPON826 was 1.00.

TABLE 4

| | | | WFE | | | | | | |
|---|---|---|---|---|---|---|---|---|---|
| | Feed Rate | Temp | HTR1 Effluent | | HTR2 Effluent | | Wt % | BA | H107 | BYK |
| Resin | (Kg/Hr) | (° C.) | FNP | pbw | FNP | pbw | Decanted | (pbw) | (pbw) | (pbw) |
| 1 | 28 | 88 | FNP1A | 4.770 | FNP2A | 0.653 | 45 | 0.254 | 0.231 | 0 |
| 3 | 37 | 97 | FNP1C | 4.898 | FNP2B | 0.662 | 44 | 0.251 | 0.229 | 0.0059 |
| 4 | 35 | 81 | FNP1D-1 | 4.400 | FNP2C | 0.606 | 0 | 0.240 | 0.217 | 0 |
| 5 | 37 | 98 | FNP1E | 5.263 | None | 0 | 37 | 0.393 | 0.225 | 0.0057 |

Rolled Film Evaporator (RFE) Feed Compositions.

A feed mixture for Comparative Example B was processed as follows. 5.9344 parts by weight FNP1B and 1.000 part by weight EPON826 epoxy resin were blended until homogeneous in a plastic container at 70° F. (21.1° C.). After agitation, the mixture was allowed to settle for approximately 1 hour, resulting in a clear solvent-rich upper layer, and an opaque emulsion in the bottom layer. The clear solvent-rich layer was decanted and weighed, and the weight percentage of the solvent layer determined, as reported in Table 5. 0.102 parts by weight EPON826, 0.250 parts by weight H107 and 0.307 parts by weight BA were added to the feed mixture and agitation resumed until homogeneous, approximately 15 minutes. Especially in cases in which the feed mixture did not initially phase separate after the combination of only the HTR Effluent(s) and the EPON826, it sometimes phase separated after the addition and agitation of the EPON 826, H107 and BA with the rest of the feed mixture. In those cases, the feed mixture was allowed to settle, resulting in a clear solvent-rich upper layer which was decanted and weighed. The percentage of the clear solvent layer compared to the initially-added weights of all previously-added components was calculated. To compensate for components retained in the solvent layer decant, a subsequent addition of EPON826 epoxy resin, and a second addition of H107 and BA were added accordingly, and the feed mixture was agitated until homogeneous one more time. The homogeneous emulsion was then fed into a stainless steel rolled film evaporator, model "KDL-6", 0.06 m², obtained from ChemTech, Inc., Rockwell, Ill. RFE conditions included a feed rate of 7 ml/min, a rotor speed 315 rpm, a vacuum of between 3.6-3.7 KPa, and a jacket temperature of 148° C. The distillate/condensate was collected in a trap cooled by a glycol water chiller held at 0° C. The non-volatile RFE effluent product was collected in a separate vessel, and designated Resin 2.

Examples 6-11 (Resins 6 through 11) were prepared as generally described above, and the feed mixtures were prepared according to the compositions listed in Table 5. With respect to Comparative B and Example 6, after the HTR Effluent (amounts in Table 5) was initially agitated with 1.00 parts by weight of EPON826, then allowed to settle for approximately 1 hour, a phase separation occurred. After the decant, the listed amounts (Table 5) of EPON826, H107 and BA were added. With respect to Examples 7 through 11, there was no initial phase separation when the HTR Effluent and 1.00 parts of the EPON826 epoxy resin were the only components agitated together. Additions of H107 and BA as indicated in Table 5 were completed after the first 1 hour and the feed mixture was agitated again until homogeneous. Upon sitting for 1 hour, a phase separation did occur in the feed mixtures of Examples 7-11. The decant process was performed, and a second addition of feed components (EPON826, H107 and BA) occurred (as indicated in Table 5). After the second addition process, the mixture was agitated to form a homogenous feed mixture.

TABLE 5

| | HTR Effluent | | Wt. % | First Addition, | First Addition, H107 | Second Addition, EPON826 | Second Addition, BA | Second Addition, H107 |
|---|---|---|---|---|---|---|---|---|
| Resin | FNP | pbw | Decanted | BA (pbw) | (pbw) | (pbw) | (pbw) | (pbw) |
| 2 | FNP1B | 5.9344 | 47 | 0.307 | 0.250 | 0.102 | — | — |
| 6 | FNP1D2 | 5.8978 | 52 | 0.303 | 0.250 | 0.107 | — | — |
| 7 | FNP1D3 | 5.7595 | 45 | 0.300 | 0.250 | 0.164 | 0.0535 | 0.0492 |
| 8 | FNP1D4 | 6.0940 | 45 | 0.307 | 0.250 | 0.174 | 0.0553 | 0.0520 |
| 9 | FNP1D5 | 5.9459 | 38 | 0.301 | 0.250 | 0.144 | 0.0635 | 0.0433 |
| 10 | FNP1D6 | 5.8754 | 40 | 0.300 | 0.250 | 0.150 | 0.0546 | 0.0451 |
| 11 | FNP1D7 | 5.8187 | 48 | 0.300 | 0.250 | 0.175 | 0.0662 | 0.0528 |

Cured Sample Preparation.

Comparative Example A 1.00 part by weight Resin1 was added to an appropriate cup and combined with 0.48 parts by weight L36Y curative at 70° F. (21.1° C.). The cup was closed and placed into a model "DAC 600 FVZ" SpeedMixer obtained from Flack-Tek, Inc., Landrum, S.C., and agitated at 800 rpm for 30 seconds, 1500 rpm for 30 seconds, and finally at 2000 rpm for 30 seconds. The mixed resin system was poured into a mold and cured for 3 hours at 63° C., followed by 2 hours at 91° C., and finally 6 hours at 85° C. The resulting cured sample was allowed to cool slowly back to 70° F. (21.1° C.) over approximately 8 hours then removed from the mold and cut to the requisite size for testing.

Comparative Examples B and C, and Examples 1 through 8 were prepared as generally described above, according to the compositions listed in Table 6.

TABLE 6

| Sample | Resin No. | Resin pbw | Curative Type | Curative pbw | BYK (pbw) | Nanoparticle Size Distribution |
|---|---|---|---|---|---|---|
| Comparative A | 1 | 1.00 | L36V | 0.48 | 0 | Bimodal |
| Comparative B | 2 | 1.00 | L36Y | 0.55 | 0 | Monomodal |
| Comparative C | 3 | 1.00 | L36Y | 0.44 | 0 | Bimodal |
| Example 4 | 4 | 1.00 | L36Y | 0.48 | 0.00262 | Bimodal |
| Example 5 | 5 | 1.00 | L36Y | 0.47 | 0 | Monomodal |
| Example 6 | 6 | 1.00 | L36Y | 0.49 | 0 | Monomodal |
| Example 7 | 7 | 1.00 | L36Y | 0.50 | 0 | Monomodal |
| Example 8 | 8 | 1.00 | L36Y | 0.49 | 0 | Monomodal |
| Example 9 | 9 | 1.00 | L36Y | 0.55 | 0 | Monomodal |
| Example 10 | 10 | 1.00 | L36Y | 0.49 | 0 | Monomodal |
| Example 11 | 11 | 1.00 | L36Y | 0.50 | 0 | Monomodal |

Comparative C and Examples 4 and 5 contain BYK as described in Tables 6 and 4.

Test Methods.

The following tests were performed on the cured samples. Results for Examples 1-3 are listed in Table 7; results for Comparative Examples A-C and Examples 4-11 are summarized in Table 8.

Water Uptake—Test Procedure 1.

Cured material from Examples 1-3 was cut into 20 by 20 by 2 mm sections. Two sections were dried above desiccant in a sealed bottle for 48 hours at 65° C. The sections were weighed, then placed above a layer of water in a desiccator. The desiccator was sealed and transferred to an oven set at 80° C. The sections were removed on a weekly basis, blotted dry, and reweighed before returning them back to the desiccator. This process continued until no further weight gain was recorded, from which the total water uptake was determined.

Water Uptake—Test Procedure 2.

2.3 mm thick cured material from Examples 4-11 and Comparative Examples A-C, was cut into one of two nominal sizes of 3.5 cm by 1.0 cm and 1.9 cm by 1.9 cm. Sample surfaces were sanded with a fine grit sandpaper to remove any potential surface effects and to expose fresh sample surface for the subsequent moisture uptake experiments. Samples were cleaned with water, dried in an oven at 80° C. for 10 days and weighed. Samples were then transferred to a humidity chamber and held at 85° C. and 85% relative humidity for 100 days, during which time the samples were periodically weighed to record moisture gain. After 100 days the samples were removed from the chamber, dabbed dry, and once they reached 21° C., weighed again. The percent water uptake weight thus calculated from the initial and final weights measured. Results reported herein represent an average of four samples per test.

Silica Content.

Silica content of resin components and cured resin samples was determined using a model TGA 500 thermogravimetric analyzer, obtained from TA Instruments, New Castle, Del. Samples were heated in air from 30° C. to 850° C. at 20° C./min. The noncombustible residue was taken to be the resin's original nanosilica content.

$T_g$—Test Procedure 1.

Glass transition temperature ($T_g$) of Examples 1-3 was determined using a model RDA-700 Rheometrics Dynamic Analyzer, obtained from Rheometrics, Inc., Piscataway, N.J., using a three point bend test mode. Test specimens were machined to 5.08 cm×1.27 cm×0.16 cm. Data were collected at 5° C. intervals from 35° C. to above the glass transition temperature of the resin at a heating rate of 5° C. per minute with a one minute thermal soak before each measurement was taken. The initial strain was 0.45% and the machine was in the strain adjustment mode.

$T_g$—Test Procedure 2.

$T_g$ of Examples 4-11 and Comparative Examples A-C was determined using a model DMA Q800 Dynamic Mechanical Analyzer, obtained from TA Instruments, Inc., New Castle, Del., using a dual cantilever beam test fixture run in strain control mode at strain amplitude 15 μm. Specimens were machined to nominal dimensions of 3.5 by 1.0 cm. Two samples each were measured for dry $T_g$ and wet $T_g$, corresponding to the initial and final water uptake samples from the Water Uptake Test Procedure 2 described above. Samples were equilibrated at 30° C., held isothermal for 1 minute, then ramped at 5° C./min to 160° C. The "Delta $T_g$" as reported is the average dry $T_g$ value minus the average wet $T_g$ value.

TABLE 7

| Sample | PTMS:IOTMS (Mole ratio) | Silica Content (wt %) | Water Uptake @ Equilibrium (wt %) | Water Uptake Reduction (%) | $T_g$ (° C.) Dry | $T_g$ (° C.) Wet |
|---|---|---|---|---|---|---|
| Example 1 | 90:10 | 45.1 | 2.92 | 26.08 | 124.5 | 82.0 |
| Example 2 | 80:20 | 45.1 | 2.81 | 28.86 | 123.0 | 87.5 |
| Example 3 | 70:30 | 45.1 | 2.79 | 29.37 | 124.6 | 83.7 |

TABLE 8

| Sample | Silica Content (wt %) | Water Uptake @ Equilibrium wt % | Water Uptake @ Equilibrium % Reduction | Average $T_g$ (° C.) Dry | Average $T_g$ (° C.) Wet | Average $T_g$ (° C.) $\Delta T_g$ |
|---|---|---|---|---|---|---|
| Comparative A | 33.0 | 2.20 | — | — | — | — |
| Comparative B | 30.2 | 2.42 | Control | 125 | 74 | 51 |
| Comparative C | 34.4 | 2.22 | Control | 127 | 89 | 39 |
| Example 4 | 31.3 | 2.13 | 4 | 130 | 99 | 31 |
| Example 5 | 32.7 | 1.86 | 16 | 127 | 98 | 29 |
| Example 6 | 33.0 | 2.23 | 8 | 127 | 93 | 34 |
| Example 7 | 32.5 | 2.27 | 6 | 128 | 91 | 37 |
| Example 8 | 33.1 | 2.22 | 8 | 127 | 89 | 38 |
| Example 9 | 30.6 | 2.34 | 3 | 124 | 78 | 47 |
| Example 10 | 33.3 | 2.21 | 9 | 128 | 92 | 35 |
| Example 11 | 33.1 | 2.26 | 7 | 128 | 91 | 37 |

Comparing the water uptake at equilibrium from Samples of Comparative B and Comparative A, the water uptake was reduced from 2.42 wt % down to 2.20 wt %. This corresponds to a lower water uptake in Comparative A which had a bi-modal size distribution of functionalized nanoparticles in the resin component, while Comparative B sample had a monomodal size distribution of functionalized nanoparticles in the resin component.

Comparing the water uptake at equilibrium from Samples of Comparative C (Control for this comparison) to that of Examples 4 and 5, it is evident that the water uptake at equilibrium was reduced between 4 and 16%. Comparative C, and Examples 4 and 5 all contained de-foamer and were cured with L36V curative. Further examining the delta $T_g$ for the three samples, it can be noted that the Examples 4 and 5 show less of a degradation (only 29-31° C.) between the dry and wet $T_g$ values when compared to Comparative C (39° C.).

Comparing the water uptake at equilibrium from samples of Comparative B (Control for this comparison) and Examples 6 through 11, it is evident that the water uptake at equilibrium was reduced between 3 and 9 percent. Comparative B, and Examples 6 through 11 did not contain de-foamer and were cured with L36Y curative. Further examining the delta $T_g$ for the Comparative B and Examples 6 through 11, it can be noted that the samples from Examples 6 through 11 show less of a degradation (delta $T_g$ ranging from 34 to 47° C.) between the dry and wet $T_g$ values when compared to Comparative C (51° C.). Generally, the samples which exhibited less water uptake also exhibited the best preservation of $T_g$ (smallest delta $T_g$) after exposure to hot wet conditions.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Additional Embodiments

The following exemplary embodiments are provided, the numbering of which is not to be construed as designating levels of importance:

Embodiment 1 provides a resin component comprising:
a curable resin; and
nanoparticles dispersed in the resin, the nanoparticles each independently comprising surface-bonded hydrophobically-modifying $(C_1-C_{50})$hydrocarbyl groups, wherein at least one of the $(C_1-C_{50})$hydrocarbyl groups is a $(C_1-C_{50})$alkyl group.

Embodiment 2 provides the resin component of Embodiment 1, wherein the curable resin is about 35 wt % to about 99 wt % of the resin component.

Embodiment 3 provides the resin component of any one of Embodiments 1-2, wherein the curable resin is about 35 wt % to about 90 wt % of the resin component.

Embodiment 4 provides the resin component of any one of Embodiments 1-3, wherein the curable resin is an epoxy resin, a curable imide resin, a vinyl ester resin, an acrylic resin, a bisbenzocyclobutane resin, a polycyanate ester resin, a maleimide resin, a diglycidyl ether of a bisphenol, or a combination thereof.

Embodiment 5 provides the resin component of any one of Embodiments 1-4, wherein the curable resin is an epoxy resin.

Embodiment 6 provides the resin component of any one of Embodiments 1-5, wherein the nanoparticles are about 1 wt % to about 65 wt % of the resin component.

Embodiment 7 provides the resin component of any one of Embodiments 1-6, wherein the nanoparticles are about 15 wt % to about 65 wt % of the resin component.

Embodiment 8 provides the resin component of any one of Embodiments 1-7, wherein the nanoparticles comprise silica, titania, alumina, zirconia, vanadia, chromia, iron oxide, antimony oxide, tin oxide, calcium carbonate, calcite, or a combination thereof.

Embodiment 9 provides the resin component of any one of Embodiments 1-8, wherein the nanoparticles are silica nanoparticles.

Embodiment 10 provides the resin component of any one of Embodiments 1-9, wherein the nanoparticles have a particle size of about 1 nm to less than about 1,000 nm.

Embodiment 11 provides the resin component of any one of Embodiments 1-10, wherein the nanoparticles have a particle size of about 5 nm to about 500 nm.

Embodiment 12 provides the resin component of any one of Embodiments 1-11, wherein the nanoparticles have a particle size of about 10 nm to about 200 nm.

Embodiment 13 provides the resin component of any one of Embodiments 1-12, wherein the nanoparticles have at least two average particle sizes.

Embodiment 14 provides the resin component of any one of Embodiments 1-13, wherein the surface-bonded hydrophobically-modifying $(C_1-C_{50})$hydrocarbyl group is a $(C_6-C_{50})$aryl group.

Embodiment 15 provides the resin component of any one of Embodiments 1-14, wherein at least one of the surface-bonded hydrophobically-modifying $(C_1-C_{50})$hydrocarbyl groups is a phenyl group.

Embodiment 16 provides the resin component of any one of Embodiments 1-15, wherein the surface-bonded hydrophobically-modifying $(C_1-C_{50})$alkyl group is a $(C_1-C_{10})$alkyl group.

Embodiment 17 provides the resin component of any one of Embodiments 1-16, wherein the surface-bonded hydrophobically-modifying $(C_1-C_{50})$alkyl group is a methyl, ethyl, or isooctyl group.

Embodiment 18 provides the resin component of any one of Embodiments 1-17, wherein the surface-bonded hydrophobically-modifying $(C_1-C_{50})$hydrocarbyl groups are derived from monohydric alcohols, polyols, organosilanes, organotitanates, or combinations thereof.

Embodiment 19 provides the resin component of any one of Embodiments 1-18, wherein the surface-bonded hydrophobically-modifying $(C_1-C_{50})$hydrocarbyl group is bonded to the nanoparticle via a —$SiR^1R^2$— linker, wherein $R^1$ and $R^2$ are independently chosen from a bond to the nanoparticle, a $(C_1-C_{15})$alkyl group, a $(C_1-C_{15})$alkoxy group, a $(C_6-C_{18})$aryl group, and an —O—C(O)—$(C_1-C_{15})$alkane group.

Embodiment 20 provides the resin component of any one of Embodiments 1-19, wherein the nanoparticles comprising the surface-bonded hydrophobically-modifying $(C_1-C_{50})$hydrocarbyl groups are formed by reacting an unmodified nanoparticle with a silane having the structure:

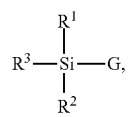

wherein
$R^1$, $R^2$, and $R^3$ are independently chosen from a $(C_1-C_{15})$alkyl group, a $(C_1-C_{15})$alkoxy group, a $(C_6-C_{18})$aryl group, and an —O—C(O)—$(C_1-C_{15})$alkane group, wherein at least one of $R^1$, $R^2$, and $R^3$ is a $(C_1-C_{15})$alkoxy group or an —O—C(O)—$(C_1-C_{15})$alkane group, and G is the hydrophobically-modifying $(C_1-C_{50})$hydrocarbyl group.

Embodiment 21 provides the resin component of any one of Embodiments 1-20, wherein the nanoparticle comprising the surface-bonded hydrophobically-modifying $(C_1-C_{50})$hydrocarbyl group is formed via treatment of the nanoparticle with phenyltrimethyloxysilane, diphenyldimethoxysilane, triphenylmethoxysilane, isooctyltrimethoxysilane, diisooctyldimethoxysilane, triisooctylmethoxysilane, methyltrimethoxysilane, dimethyldimethoxysilane, trimethylmethoxysilane, phenyltriacetoxysilane, diphenyldiacetoxysilane, triphenylacetoxysilane, ethyltriacetoxysilane, diethyldiacetoxysilane, triethylacetoxysilane, methyltriacetoxysilane, dimethyldiacetoxysilane, trimethylacetoxysilane, isooctyltriacetoxysilane, diisooctylacetoxysilane, triisooctylacetoxysilane, or a combination thereof.

Embodiment 22 provides the resin component of any one of Embodiments 1-21, wherein the surface-bonded hydrophobically-modifying $(C_1-C_{50})$hydrocarbyl groups comprise a blend of more than one kind of the $(C_1-C_{50})$hydrocarbyl groups.

Embodiment 23 provides the resin component of any one of Embodiments 1-22, wherein the surface-bonded hydrophobically-modifying $(C_1-C_{50})$hydrocarbyl groups comprise a blend of more than one kind of $(C_1-C_{50})$alkyl group.

Embodiment 24 provides the resin component of any one of Embodiments 1-23, wherein the surface-bonded hydrophobically-modifying $(C_1-C_{50})$hydrocarbyl groups comprise a blend of a $(C_6-C_{50})$aryl group and the $(C_1-C_{50})$alkyl group.

Embodiment 25 provides the resin component of Embodiment 24, wherein the surface-bonded hydrophobically-modifying $(C_6-C_{50})$aryl groups and the surface-bonded hydrophobically-modifying $(C_1-C_{50})$alkyl groups have a mole ratio of about 99:1 to about 1:99.

Embodiment 26 provides the resin component of any one of Embodiments 24-25, wherein the surface-bonded hydrophobically-modifying $(C_6-C_{50})$aryl groups and the surface-bonded hydrophobically-modifying $(C_1-C_{50})$alkyl groups have a mole ratio of about 95:5 to about 50:50.

Embodiment 27 provides the resin component of any one of Embodiments 24-26, wherein the surface-bonded hydrophobically-modifying $(C_6-C_{50})$aryl groups and the surface-bonded hydrophobically-modifying $(C_1-C_{50})$alkyl groups have a mole ratio of about 90:10 to about 70:30.

Embodiment 28 provides the resin component of any one of Embodiments 24-27, wherein a cured product of the resin component and a curative component absorbs a smaller amount of moisture over a given time period as compared to a cured product of a corresponding resin component having a lower mole ratio of the $(C_1-C_{50})$alkyl group to the $(C_6-C_{50})$aryl group and the curative component over the same time period and under the same conditions.

Embodiment 29 provides the resin component of any one of Embodiments 24-28, wherein a cured product of the resin component and a curative component has a change in glass transition temperature between the two conditions of after drying for 10 days at 80° C. air at low humidity and after exposure to 85% humidity air at 85° C. for 10 days that is smaller than the change in glass transition temperature observed for a cured product of a corresponding resin component having a lower mole ratio of the $(C_1-C_{50})$alkyl group to the $(C_6-C_{50})$aryl group and the curative component under the same two conditions.

Embodiment 30 provides the resin component of any one of Embodiments 24-29, wherein a cured product of the resin component and a curative component has a higher glass transition temperature after drying for 10 days at 80° C. air at low humidity as compared to the glass transition temperature observed for a cured product of a corresponding resin component having a lower mole ratio of the $(C_1-C_{50})$alkyl group to the $(C_6-C_{50})$aryl group and the curative component under the same conditions.

Embodiment 31 provides the resin component of any one of Embodiments 24-30, wherein a cured product of the resin component and a curative component has a higher glass transition temperature after exposure to 85% humidity air at 85° C. for 10 days as compared to the glass transition temperature observed for a cured product of a corresponding resin component having a lower mole ratio of the $(C_1-C_{50})$alkyl group to the $(C_6-C_{50})$aryl group and the curative component under the same conditions.

Embodiment 32 provides the resin component of any one of Embodiments 1-31, wherein the surface-bonded hydrophobically-modifying $(C_1-C_{50})$hydrocarbyl groups comprise a blend of a phenyl group and a $(C_1-C_{10})$alkyl group.

Embodiment 33 provides the resin component of any one of Embodiments 1-32, wherein the nanoparticles, the curable resin, the resin component, or a combination thereof, are substantially free of inorganic water-soluble salts.

Embodiment 34 provides the resin component of any one of Embodiments 1-33, wherein the nanoparticles, the curable resin, the resin component, or a combination thereof, are substantially free of KOH, NaOH, $NH_4OH$, or a combination thereof.

Embodiment 35 provides a resin system comprising
the resin component of any one of Embodiments 1-34; and
a curative component.

Embodiment 36 provides the resin system of Embodiment 35, wherein the resin component and the curative component are substantially homogeneously mixed.

Embodiment 37 provides the resin system of any one of Embodiments 35-36, wherein the resin system is a curable system.

Embodiment 38 provides the resin system of any one of Embodiments 35-37, wherein the nanoparticles are about 1 wt % to about 80 wt % of the resin system.

Embodiment 39 provides the resin system of any one of Embodiments 35-38, wherein the nanoparticles are about 15 wt % to about 50 wt % of the resin system.

Embodiment 40 provides the resin system of any one of Embodiments 35-39, wherein the resin system is a thermoset resin system.

Embodiment 41 provides the resin system of any one of Embodiments 35-40, wherein the resin component is about 1 wt % to about 99 wt % of the resin system.

Embodiment 42 provides the resin system of any one of Embodiments 35-41, wherein the resin component is about 60 wt % to about 90 wt % of the resin system.

Embodiment 43 provides the resin system of any one of Embodiments 35-42, wherein the curative component is about 1 wt % to about 99 wt % of the resin system.

Embodiment 44 provides the resin system of any one of Embodiments 35-43, wherein the curative component is about 3 wt % to about 55 wt % of the resin system.

Embodiment 45 provides the resin system of any one of Embodiments 35-44, wherein the curative component is present in an amount of about 0.1 to about 2 times a stoichiometric amount of the curable resin.

Embodiment 46 provides the resin system of any one of Embodiments 35-45, wherein the curative component comprises a curing agent, a catalyst, a crosslinker, or a combination thereof.

Embodiment 47 provides the resin system of any one of Embodiments 35-46, wherein the curative component comprises an anhydride, an amine curing agent, an amide curing agent, a polycarboxylic acid, a polyphenol, or a combination thereof.

Embodiment 48 provides the resin system of any one of Embodiments 35-47, wherein the curative component is a substituted or unsubstituted phthalic anhydride, a hydrogenated derivative of a substituted or unsubstituted phthalic anhydride, a dicyandiamide, a diaminodiphenylsulfone, or a combination thereof.

Embodiment 49 provides the resin system of any one of Embodiments 35-48, wherein the viscosity of the resin system is suitable for preparation of a composite article via resin transfer molding, filament winding, tow placement, resin infusion processes, pultrusion, or a combination thereof.

Embodiment 50 provides the resin system of any one of Embodiments 35-49, further comprising a catalyst, dye, flame retardant, pigment, impact modifier, flow control agent, reactive diluent, de-foamer, a curing accelerator, a catalyst, filler, solvent, urea, or a combination thereof.

Embodiment 51 provides the resin system of any one of Embodiments 35-50, wherein after mixing at room temperature the resin system has a room temperature complex viscosity of 0.1 Pa·s to about 300 Pa·s.

Embodiment 52 provides the resin system of any one of Embodiments 35-51, wherein after mixing at room temperature the resin system has a room temperature complex viscosity of about 1 Pa·s to about 100 Pa·s.

Embodiment 53 provides a method of forming the resin system of any one of Embodiments 35-52, comprising combining the resin component with the curable component to form the resin system.

Embodiment 54 provides a cured product of the resin system of any one of Embodiments 35-52.

Embodiment 55 provides the cured product of Embodiment 54, wherein after exposure to 85° C. air with 85% humidity after 11 days the total moisture uptake is about 0 wt % to about 3 wt %.

Embodiment 56 provides the cured product of any one of Embodiments 54-55, wherein after exposure to 85° C. air with 85% humidity after 11 days the total moisture uptake is about 1.5 wt % to about 2.5 wt %.

Embodiment 57 provides the cured product of any one of Embodiments 54-56, wherein a change in glass transition temperature of the cured product between conditions of after 10 days at 80° C. air at low humidity and after exposure to 85% humidity air at 85° C. for 10 days is about 10° C. to about 60° C.

Embodiment 58 provides the cured product of any one of Embodiments 54-57, wherein a change in glass transition temperature of the cured product between conditions of after 10 days at 80° C. air at low humidity and after exposure to 85% humidity air at 85° C. for 10 days is about 25° C. to about 40° C.

Embodiment 59 provides the cured product of any one of Embodiments 54-58, wherein the cured product has a water content of less than or equal to about 5 wt %.

Embodiment 60 provides the cured product of any one of Embodiments 54-59, wherein the cured product has a water content of about 0 wt % to about 2 wt %.

Embodiment 61 provides a method of forming the cured product of any one of Embodiments 54-60, the method comprising:
curing a reaction mixture comprising the resin system, to form the cured product of any one of Embodiments 56-62.

Embodiment 62 provides the method of Embodiment 61, further comprising mixing at least the resin component and the curative component to form the reaction mixture.

Embodiment 63 provides the method of any one of Embodiments 61-62, wherein curing the reaction mixture comprising the resin system comprises heating the reaction mixture.

Embodiment 64 provides an article comprising the cured product of any one of Embodiments 54-60.

Embodiment 65 provides the article of Embodiment 64, wherein the article comprises a composite comprising fibers impregnated with the cured product.

Embodiment 66 provides the article of any one of Embodiments 64-65, wherein the article comprises a substrate comprising a coating comprising the cured product.

Embodiment 67 provides a resin component comprising:
an epoxy resin, wherein the epoxy resin is about 35 wt % to about 90 wt % of the resin component; and
nanoparticles dispersed in the resin, the nanoparticles having a particle size of about 5 nm to about 500 nm, wherein the nanoparticles are about 15 wt % to about 65 wt % of the resin component, the nanoparticles each independently comprising surface-bonded hydrophobically-modifying ($C_1$-$C_{50}$)hydrocarbyl groups, wherein at least some of the ($C_1$-$C_{50}$)hydrocarbyl groups are chosen from a phenyl group and a ($C_1$-$C_{10}$)alkyl group, wherein the mole ratio of the phenyl group to the ($C_1$-$C_{10}$)alkyl group is about 95:5 to about 50:50.

Embodiment 68 provides the resin component, resin system, cured product, method, or article of any one or any combination of Embodiments 1-67 optionally configured such that all elements or options recited are available to use or select from.

What is claimed is:

1. A resin component comprising:
a curable resin; and
nanoparticles dispersed in the resin, the nanoparticles each independently comprising surface-bonded hydrophobically-modifying ($C_1$-$C_{50}$)hydrocarbyl groups, wherein at least one of the ($C_1$-$C_{50}$)hydrocarbyl groups is a ($C_1$-$C_{50}$)alkyl group and at least one of the surface-bonded hydrophobically-modifying ($C_1$-$C_{50}$)hydrocarbyl groups is a ($C_6$-$C_{50}$)aryl group, wherein the surface-bonded hydrophobically-modifying ($C_6$-$C_{50}$)aryl groups and the surface-bonded hydrophobically-modifying ($C_1$-$C_{50}$)alkyl groups have a mole ratio of from 95:5 to 50:50.

2. The resin component of claim 1, wherein the curable resin is about 35 wt % to about 99 wt % of the resin component.

3. The resin component of claim 1, wherein the nanoparticles are about 1 wt % to about 65 wt % of the resin component.

4. The resin component of claim 1, wherein at least one of the surface-bonded hydrophobically-modifying ($C_1$-$C_{50}$) hydrocarbyl groups is a phenyl group.

5. The resin component of claim 1, wherein the surface-bonded hydrophobically-modifying ($C_1$-$C_{50}$)hydrocarbyl group is bonded to the nanoparticle via a —$SiR^1R^2$— linker, wherein $R^1$ and $R^2$ are independently chosen from a bond to the nanoparticle, a ($C_1$-$C_{15}$)alkyl group, a ($C_1$-$C_{15}$)alkoxy group, and a ($C_6$-$C_{18}$)aryl group.

6. The resin component of claim 1, wherein the surface-bonded hydrophobically-modifying ($C_1$-$C_{50}$)hydrocarbyl groups comprise a blend of the ($C_6$-$C_{50}$)aryl group and a ($C_1$-$C_{10}$)alkyl group.

7. The resin component of claim 1, wherein the surface-bonded hydrophobically-modifying $(C_1\text{-}C_{50})$hydrocarbyl groups comprise a blend of a phenyl group and a $(C_1\text{-}C_{10})$ alkyl group.

8. A resin system comprising
   the resin component of claim 1; and
   a curative component.

9. The resin system of claim 8, wherein the curative component comprises a curing agent, a catalyst, a cross-linker, or a combination thereof.

10. A method of forming the resin system of claim 8, comprising combining the resin component with the curative component to form the resin system.

11. A cured product of the resin system of claim 8.

12. A method of forming the cured product of claim 11, the method comprising:
   curing a reaction mixture comprising the resin system, to form the cured product.

13. An article comprising the cured product of claim 11.

14. A resin component comprising:
   an epoxy resin, wherein the epoxy resin is about 35 wt % to about 90 wt % of the resin component; and
   nanoparticles dispersed in the resin, the nanoparticles having a particle size of about 5 nm to about 500 nm, wherein the nanoparticles are about 15 wt % to about 65 wt % of the resin component, the nanoparticles each independently comprising surface-bonded hydrophobically-modifying $(C_1\text{-}C_{50})$hydrocarbyl groups, wherein at least some of the $(C_1\text{-}C_{50})$hydrocarbyl groups are chosen from a phenyl group and a $(C_1\text{-}C_{10})$alkyl group, wherein the mole ratio of the phenyl group to the $(C_1\text{-}C_{10})$alkyl group is about 95:5 to about 50:50.

\* \* \* \* \*